United States Patent Office 3,154,508
Patented Oct. 27, 1964

3,154,508
HIGH IMPACT STRENGTH COMPOSITION CONTAINING ISOTACTIC POLYPROPYLENE, ASPHALT AND ELASTOMER
James B. Clelland, Newtown Square, Pa., assignor to Sun Oil Company, Philadelphia, Pa., a corporation of New Jersey
No Drawing. Filed Nov. 23, 1960, Ser. No. 71,162
3 Claims. (Cl. 260—28.5)

This invention relates to a plastic composition having utility in the manufacture of soil pipe, and more particularly to a composition comprising polypropylene, asphalt, and an elastomer, in the proportions hereinafter set forth.

Materials used for the manufacture of soil pipe must be low in cost, since they must compete with cast iron, must possess a reasonably high tensile strength and, most importantly, must possess a high impact strength and low brittle point, since soil pipe is subjected to rough handling during transportation from the warehouse to the construction site. For example, in unloading soil pipe from a truck, it is customary to throw it from a considerable height to a hard surface, such as a paved road.

It has heretofore been proposed to incorporate an elastomer such as butyl rubber into isotactic polypropylene in order to improve impact and brittle point but, while a moderate improvement in properties is obtained, the cost of compositions containing only polypropylene and butyl rubber is so high that the compositions are not competitive in the soil pipe field. In the past, also, attempts have been made to lower the cost of plastic compositions comprising polypropylene by blending polypropylene with low-cost fillers such as asphalt. The polypropylene-asphalt blends may contain up to 40% or so of asphalt, so that the price of the composition is competitive in the soil pipe field, but the brittle point and impact strength of the compositions are about the same as the properties of unmodified polypropylene, and the compositions are therefore not fitted for use in applications in which high impact strength and low brittle point are required.

I have now found that if a combination of asphalt and an elastomer such as natural rubber, butyl rubber, or an ethylene-propylene copolymer is blended with isotactic polypropylene, the resultant composition has the advantage of low cost, low brittle point, and, surprisingly, a far higher impact strength than can be obtained by blending an equivalent amount of the elastomer with the polypropylene alone. The amount of polypropylene in the blend may vary from about 50% to about 80%, the asphalt may vary from about 15% to 45%, and the amount of elastomer may be from 5% to 25%. Preferably the weight ratio of asphalt to elastomer is about 2:1, although weight ratios of from 5:1 to 1:1 may be used with good results. The materials may be blended in any equipment which will produce a homogeneous product, but preferably a Banbury rubber mill is used.

Physical properties of blends of polypropylene with elastomers alone, with asphalt alone, and with a mixture of asphalt and elastomer are set forth in the following table. The asphalt used had a viscosity of 7870 SUS at 210° F.; softening point 100° F., and a penetration at 77° F. of 168.

*Table I*

| Composition, Weight Percent: | | | | | | |
|---|---|---|---|---|---|---|
| Polypropylene | 100 | 95 | 90 | 85 | 80 | 60 |
| Asphalt | | | | | | 40 |
| Butyl Rubber | | 5 | 10 | 15 | 20 | |
| Ethylene-Propylene Copolymer | | | | | | |
| Properties: | | | | | | |
| Izod Impact (notched), ft. lbs./in | 0.8 | 1.24 | 1.84 | 2.5 | 3.76 | .89 |
| Brittle Point, ° C | +14 | +12 | +8 | 0 | −9 | +10 |
| Yield Strength, 1″/min., p.s.i. | 5,200 | 4,749 | 4,288 | 3,840 | 3,569 | 2,082 |
| Heat Distortion, ° C | 53 | | | | | 37 |
| Composition, Weight Percent: | | | | | | |
| Polypropylene | 51 | 51 | 60 | 70 | 50 | |
| Asphalt | 34 | 34 | 30 | 25 | 40 | |
| Butyl Rubber | 15 | | 10 | 5 | 10 | |
| Ethylene-Propylene Copolymer | | 15 | | | | |
| Properties: | | | | | | |
| Izod Impact (notched), ft. lbs./in | 15.5 | 15.0 | 9.0 | 4.0 | 12.0 | |
| Brittle Point, ° C | −7.5 | −4.5 | +3 | +9 | 0 | |
| Yield Strength, 1″/min., p.s.i. | 1,835 | 2,160 | 2,350 | 3,000 | 1,700 | |
| Heat Distortion, ° C | 35 | 67 | 38 | 41 | 33 | |

As may be observed from the foreoing, the blend of asphalt and polypropylene alone had a brittle point and impact strength about equivalent to the unmodified polypropylene, the blends containing polypropylene and butyl rubber alone had somewhat improved impact strength and brittle point, but the blends containing both the elastomer and asphalt had impact strength far higher than could be predicted from a knowledge of the impact properties of blends of polypropylene and an elastomer alone. Thus asphalt alone has little or no effect on impact strength, and 15% of butyl rubber in polypropylene increases the impact strength only to 2.5, yet the combination of 15% elastomer and asphalt raises the impact strength to 15 and over. It is not known how the asphalt and elastomer cooperate to achieve this result, but the unexpected synergism between the two is evident from the data.

The properties given in the foregoing Table I were obtained as follows:

Izod impact by ASTM _____ D256–54T, Method A.
Brittle point by ASTM _____ D746–57T.
Yield strength by ASTM _____ D638–58T.
Heat distortion by ASTM _____ D648–56.

The invention claimed is:
1. A new composition of matter comprising from about

50% to about 80% isotactic polypropylene, about 15% to 45% asphalt, and from about 5% to 25% of an elastomer selected from the group consisting of butyl rubber and an ethylene-propylene copolymer, said composition having a tensile strength of at least 1700 p.s.i. and an Izod impact strength of at least 4.

2. The composition according to claim 1 in which the elastomer is butyl rubber.

3. The composition according to claim 1 in which the elastomer is an ethylene-propylene copolymer.

References Cited in the file of this patent
UNITED STATES PATENTS

| | | |
|---|---|---|
| 2,197,461 | Anderson et al. | Apr. 16, 1940 |
| 2,298,846 | Skooglund | Oct. 13, 1942 |
| 2,339,958 | Sparks | Jan. 25, 1944 |
| 2,871,212 | Thayer | Jan. 27, 1959 |
| 2,909,498 | Sayko | Oct. 20, 1959 |
| 2,918,940 | Carr | Dec. 29, 1959 |
| 2,978,426 | Zapp | Apr. 4, 1961 |
| 3,037,954 | Gessler et al. | June 5, 1962 |